G. M. EATON.
PANTOGRAPH TROLLEY.
APPLICATION FILED NOV. 5, 1915.
1,323,258.
Patented Dec. 2, 1919.
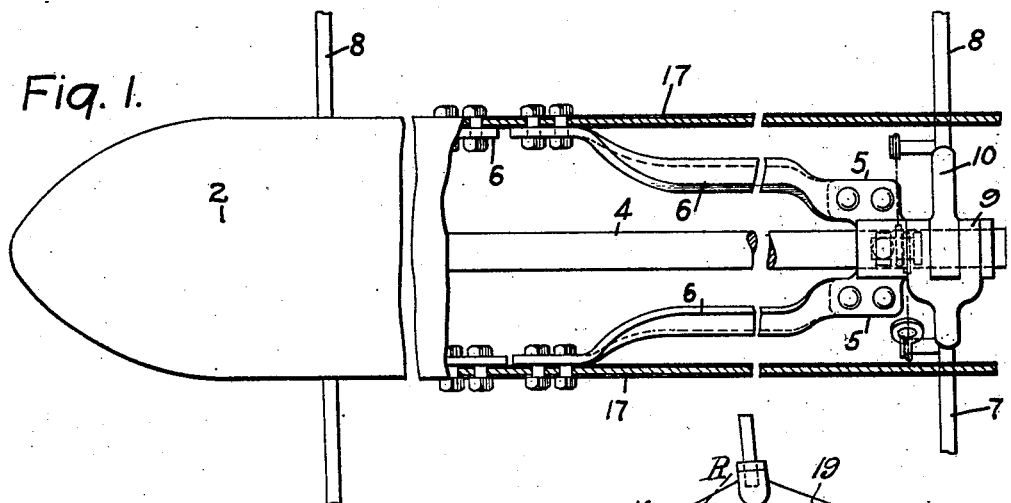
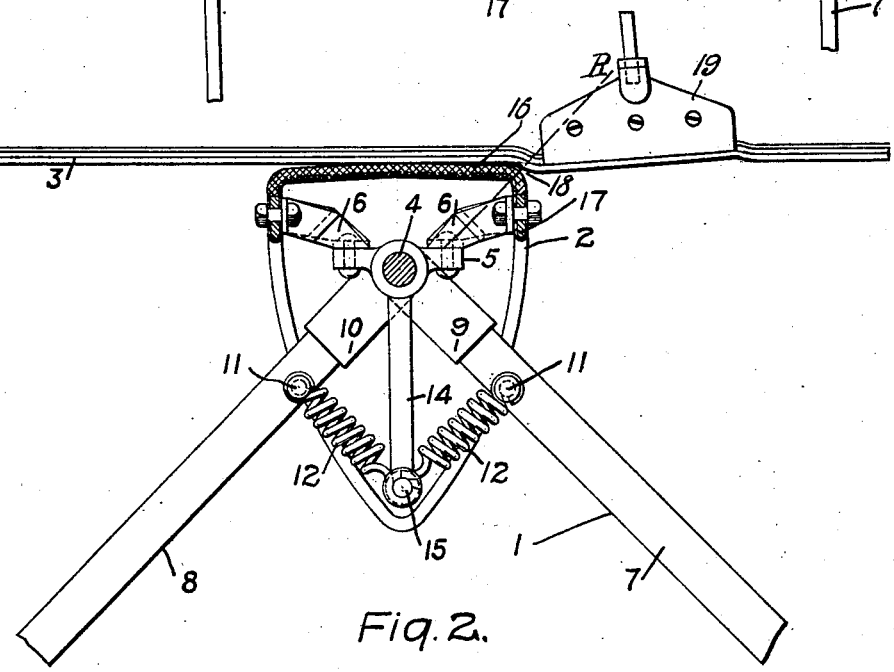
WITNESSES:
INVENTOR
George M. Eaton.
BY
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

PANTOGRAPH-TROLLEY.

1,323,258.

Specification of Letters Patent.

Patented Dec. 2, 1919.

Application filed November 5, 1915. Serial No. 59,823.

*To all whom it may concern:*

Be it known that I, GEORGE M. EATON, a citizen of the United States, and a resident of Pittsburgh, in the county of Allegheny and State of Pennsylvania, have invented a new and useful Improvement in Pantograph-Trolleys, of which the following is a specification.

My invention relates to trolleys and it has special reference to pantograph trolleys that are adapted to collect relatively large amounts of current at high speeds.

One object of my invention is to provide a current-collecting device of the above indicated class that shall be simple and durable in construction and effective and reliable in operation and that shall be particularly adapted to effect good electrical engagement with the trolley conductor.

A further object of my invention is to provide a pantograph trolley having a current-collecting member flexibly connected to the pantograph frame and so arranged that, in being drawn along the trolley conductor, the leading edge of the member will take a position lower than the following edge, when an obstruction on the trolley conductor is encountered.

In order to secure the above designated results, I connect a rigid current-collecting member to a pantograph frame solely by spring members which allow the leading edge of the collecting member to assume a lower position than the following edge when the progress of the member along the trolley conductor is interrupted by meeting an obstruction on the trolley conductor.

In the accompanying drawing, Figure 1 is a diagrammatic plan view, partially in section, of a device constructed in accordance with my invention, and Fig. 2 is a side elevation, partially in section, of the device shown in Fig. 1.

Referring to the drawing, the apparatus shown embodies a pantograph frame 1, a current-collecting member 2 adapted to coöperate with a trolley conductor 3, a shaft 4 connected to the frame 1, brackets 5 mounted upon the shaft 4, and flexible members 6 connecting the current-collecting member 2 to the bracket 5.

The pantograph frame 1 comprises a plurality of pairs of shear arms 7 and 8 the upper ends of each pair of which are connected together by hinge pieces 9 and 10 and shaft 4. The shaft 4 not only acts as a pin for each pair of hinge pieces but connects and holds the pairs of shear arms in proper relation to each other. Each of the shear arms 7 and 8 is provided with a pin 11 having one end of a spring 12 attached thereto.

Each of the brackets 5 is rotatably mounted on the shaft 4 and is provided with an arm 14 that projects downwardly and has a pin 15 at its lower end to which the inner ends of the springs 12 are connected.

The current-collecting member 2 has a central, relatively wide working portion 16 that is beveled slightly from each edge to the center, as shown in Fig. 2, in order that good contact may be made with the trolley conductor, and it also has flanges 17 to which the flexible members 6 are attached in any convenient manner.

The flexible members 6 may be flat springs which are given a one-eighth turn at each end and are offset sufficiently to join the flanges 17 of the current-collecting member to the body members 13 of the brackets 5 and thus hold the member 2 in its normal position when the trolley is stationary.

In describing the operation of my device, it will be assumed, for convenience in designating the relative positions of different parts, when stationary and when in motion, that the trolley is operating along a horizontal trolley conductor and is just engaging a projection 18 on the trolley conductor, such as a bend in the trolley wire caused by a misplaced trolley hanger 19. The impact resistance that results from the engagement of the front edge of the shoe with the projection 18 will be exerted in some such direction as that indicated by the dotted line R. Since the initial resistance exerted by the springs 12 is preferably materially greater than that exerted by the springs 6, the latter will permit the shoe 2 to turn from its horizontal position before the brackets 5 will turn on the shaft 4. Since the front and rear members 6 are twisted in opposite directions, the former present flat sides to the force which is applied to the leading edge of the shoe 2 and, therefore, yield more readily to the impact than the latter, which present their edges to the applied force. By reason of the relation of members just stated, the leading edge of the shoe is lowered to clear the obstruction 18 before the springs 12 yield.

The springs 6 are of such a construction that the axis, about which the shoe tends to rotate by reason of the flexure that accrues when pressure is applied to one edge of the shoe, may be located very near to the conducting surface of the shoe. This form of mounting also renders the shoe tiltable independently of the frame members.

It may, at times, be desirable to omit the springs 12 and the arms 14 and to support the trolley shoe by the bracket members 5 and the members 6, which may be mounted, in any suitable way, upon the frame structure.

Obviously, my invention is not restricted to the specific structural details and arrangement and location of parts herein set forth, as many modifications therein may be effected without departing from the spirit and scope of my invention, and such modifications are intended to be covered by the appended claims.

I claim as my invention:

1. In a pantograph trolley, the combination with a pantograph frame, and a current-collecting shoe adapted to extend transversely of a trolley wire to engage the same, of means for supporting said shoe upon said frame, comprising a pair of transversely extending, substantially horizontally disposed resilient members, pivotally connected to said frame and secured to said shoe adjacent the leading and trailing edges thereof.

2. In a trolley, the combination of a supporting frame, a current-collecting shoe having front and rear depending flanges adapted to extend transversely of the trolley wire, and means for mounting said shoe upon said frame, comprising a plurality of transversely extending, substantially horizontally disposed spring members pivotally connected to said frame and secured respectively to said front and rear flanges, said spring members being oppositely bent to offer less resistance to bending stresses at the leading edge than at the trailing edge.

3. In a pantograph trolley, the combination with a pantograph frame, and a current-collecting shoe, of means for mounting said shoe upon said frame, comprising yieldable means tending to maintain said shoe substantially horizontal, and a pair of oppositely bent, substantially horizontally disposed spring members, independent of the aforesaid yieldable means, said spring members being pivotally connected to said frame, and rigidly connected to said shoe adjacent the leading and trailing edges thereof.

4. In a pantograph trolley, the combination with a pantograph frame and a current-collecting shoe, of means for mounting said shoe upon said frame, comprising a bracket pivoted on said frame, means for yieldingly limiting the movement of said bracket, and a pair of transversely extending, substantially horizontally disposed spring members secured to said bracket adjacent to the leading and trailing edges of said shoe, said spring members being oppositely bent and having a greater moment of resistance to bending stresses at the leading edge than at the trailing edge.

5. The combination with a pantograph frame including shear arms, hinge connections joining said arms, and brackets connected to said arms, of a current-collecting member, and substantially horizontal flexible members having their ends rigidly joined to the collecting member and to said brackets.

6. The combination with a pantograph frame consisting of two sets of shear arms, a shaft connecting the sets of shear arms together, and a bracket for each set of shear arms which is mounted on said shaft, of a collecting member, and flexible means connecting each bracket with said collecting member.

7. The combination with a pantograph frame, of a collecting member and two substantially horizontally disposed flat springs for connecting said collecting member to said frame.

8. The combination with a pantograph frame, of a bracket mounted on said frame, a current-collecting shoe, and a plurality of bar springs rigidly connected to said shoe and said bracket, said springs being disposed substantially parallel to said shoe.

9. The combination with a pantograph frame, of a bracket mounted on said frame, a current-collecting shoe, and a plurality of bar springs for supporting said shoe from said bracket, said springs being the sole support for said shoe.

10. The combination with a pantograph frame, of a bracket mounted on said frame, a current-collecting shoe and a plurality of springs interposed between said shoe and said bracket for supporting said shoe, each of said springs being made with a one-eighth turn at the end connected to the shoe and at the end connected to the bracket for positioning the upper edges of the springs nearer together than the lower edges.

In testimony whereof, I have hereunto subscribed my name this 28th day of Oct. 1915.

GEORGE M. EATON.